United States Patent
Hildebrandt et al.

(10) Patent No.: US 11,411,525 B2
(45) Date of Patent: Aug. 9, 2022

(54) PHOTOVOLTAIC SYSTEM AND ASSOCIATED USE

(71) Applicant: Next2Sun GmbH, Merzig (DE)

(72) Inventors: Heiko Hildebrandt, Freiburg (DE); Markus Probst, Rehlingen-Siersburg (DE); Thomas Brill, Beckingen-Reimsbach (DE); Nicolai Zwosta, Berlin (DE); Robert Baldy, Berlin (DE)

(73) Assignee: Next2Sun GmbH, Merzig (DE)

( * ) Notice: Subject to any disclaimer, the term of this patent is extended or adjusted under 35 U.S.C. 154(b) by 152 days.

(21) Appl. No.: 16/471,924

(22) PCT Filed: Dec. 20, 2017

(86) PCT No.: PCT/EP2017/083813
§ 371 (c)(1),
(2) Date: Jun. 20, 2019

(87) PCT Pub. No.: WO2018/115120
PCT Pub. Date: Jun. 28, 2018

(65) Prior Publication Data
US 2020/0153380 A1    May 14, 2020

(30) Foreign Application Priority Data
Dec. 23, 2016 (DE) .......................... 102016015436.5

(51) Int. Cl.
*H02S 20/10* (2014.01)
*F16B 9/00* (2006.01)

(52) U.S. Cl.
CPC ................ *H02S 20/10* (2014.12); *F16B 9/05* (2018.08)

(58) Field of Classification Search
CPC .......... H02S 20/10; H02S 20/20; H02S 30/10; F24S 25/10–13; F24S 25/20;
(Continued)

(56) References Cited

U.S. PATENT DOCUMENTS

| 2011/0005583 A1* | 1/2011 | Thomas | H02S 20/00 136/252 |
| 2012/0031456 A1* | 2/2012 | Christman | H02S 20/10 136/244 |

(Continued)

FOREIGN PATENT DOCUMENTS

| DE | 202014105516 | 2/2015 |
| EP | 2669596 | 12/2013 |

(Continued)

OTHER PUBLICATIONS

English machine translation of Nakahara et al. (JP 2004-335903 A) provided by the EPO website, All pages, 2021. (Year: 2021).*

(Continued)

*Primary Examiner* — Daniel P Malley, Jr.
(74) *Attorney, Agent, or Firm* — Volpe Koenig

(57) ABSTRACT

For the economical and energy-efficient use of a PV system having upright, in particular bifacial, PV modules and to substantially avoid shading of the PV modules, a supporting structure which is simple to manufacture and install is provided, that is constructed by vertical posts, which are connected to one another at intersecting points, and horizontally running cross-members such that rectangular mounting areas are provided for the individual PV modules. The posts and cross-members are formed in a material-saving manner by conventional profiles, and a division of the posts into two interconnectable sections substantially facilitates the assembly. An electrical connection is provided such that active surfaces which are arranged one above another can be operated at different electrical operating points and (Continued)

such that electrical lines are formed which are operated separately from one another and are arranged in a horizontally running manner. This minimizes effects of shading of PV modules on the efficiency of the energy conversion.

19 Claims, 6 Drawing Sheets

(58) Field of Classification Search
CPC .. F24S 25/33; F24S 25/37; F24S 25/16; F24S 25/63; F24S 25/65; F24S 25/67; F24S 25/617

See application file for complete search history.

(56) References Cited

U.S. PATENT DOCUMENTS

| | | | |
|---|---|---|---|
| 2012/0324808 A1 | 12/2012 | Reyal et al. | |
| 2013/0276304 A1* | 10/2013 | Flaherty | H02S 30/10 29/890.033 |
| 2014/0053890 A1 | 2/2014 | Yang | |
| 2016/0099673 A1* | 4/2016 | Wolter | F24S 25/10 136/251 |
| 2016/0141437 A1 | 5/2016 | Mittu et al. | |

FOREIGN PATENT DOCUMENTS

| | | | |
|---|---|---|---|
| JP | S5542720 | | 3/1980 |
| JP | H08170790 | | 7/1996 |
| JP | 2002076416 | | 3/2002 |
| JP | 2002076416 A | * | 3/2002 |
| JP | 2002237612 | | 8/2002 |
| JP | 2003229591 | | 8/2003 |
| JP | 2003229591 A | * | 8/2003 |
| JP | 2004335903 | | 11/2004 |
| JP | 2004335903 A | * | 11/2004 |
| JP | 2006080568 | | 3/2006 |
| JP | 2014236199 | | 12/2014 |
| JP | 2002076416 A | * | 3/2015 |
| JP | 2015513882 | | 5/2015 |
| WO | 2015106170 | | 7/2015 |

OTHER PUBLICATIONS

English machine translation of Araki et al. (JP 2002-76416 A) provided by the EPO website, All pages, 2021. (Year: 2021).*

SUNMetrix, "Solar Panel Size for Residential, Commercial and Portable Applications", 2015, https://sunmetrix.com/solar-panel-size-for-residential-commercial-and-portable-applications, All Pages. (Year: 2015).*

English machine translation of Sato (JP-2003229591-A) provided by the EPO website, 2021, All Pages. (Year: 2021).*

English machine translation of Araki et al. (JP-2002076416-A) provided by the EPO website, 2021, All Pages. (Year: 2021).*

* cited by examiner

PHOTOVOLTAIC SYSTEM AND ASSOCIATED USE

BACKGROUND

The invention relates to a photovoltaic (PV) system having a plurality of bifacial photovoltaic modules which are arranged upright on a supporting structure. The invention furthermore relates to a PV system having at least one bifacial PV module which is arranged upright on a supporting structure.

The invention is also concerned with the use of such PV systems for power generation in a given set-up.

Classic PV systems which use unifacial PV modules for power generation are frequently erected in an inclined form. The single active surface of the respective PV modules, which surface can convert solar radiation energy into electrical energy, is typically oriented in this case toward the south. Such systems have the disadvantage that they output their peak power at midday. This may have an impact on the power grid, namely in the event of an excessive supply of such power.

For some years, PV systems having PV modules which have active surfaces on both sides have therefore been put to the test. Said PV modules, which are referred to as bifacial, are positioned upright, and therefore the front side and rear side are in each case irradiated by the sun. If the bifacial PV modules of such PV systems are erected in a north-south direction, they can capture sunlight from eastern and western directions, in particular in early morning hours and late evening hours. This achieves a power output which is complementary to classic systems and turns out to be low around midday, but reaches peak values in the morning and in the evening. Such a power/day curve characteristic is advantageous with the effect of distributing a uniform power supply in the grid over the day. In addition, however, PV systems having bifacial PV modules can advantageously also be used in different orientations than in a north-south direction.

In contrast to unifacial PV modules, new technical problems are posed in bifacial PV modules since the rear side of the modules is also intended to be used for power generation. The supporting structures and erection concepts developed previously for unifacial PV modules are therefore applicable only to a limited extent, or would require complicated and therefore expensive adaptation.

Documents JP 2004 335903, JP 2003 229591, JP 2006 080568 and US 2011/0005583 A1 disclose upright photovoltaic systems having bifacial photovoltaic modules, in which the photovoltaic modules are arranged above one another and next to one another between two posts, wherein the photovoltaic modules are each enclosed by transverse connectors.

Document JP 2002 076416 discloses a photovoltaic system having a plurality of bifacial PV modules which are arranged upright on a supporting structure, wherein the supporting structure has a plurality of posts which are secured on or in the ground, wherein cross-members are secured to the posts, said cross-members in each case connecting two adjacent posts to each other, and wherein in each case two posts and two cross-members define a substantially rectangular mounting area in which at least one photovoltaic module is arranged, wherein the photovoltaic modules are secured to the cross-members.

DE 20 2014 105 516 U1 discloses a photovoltaic system having at least two bifacial solar modules, wherein the solar modules are in each case held in one or two module holders, and wherein it is provided that the module holders are configured to hold the two bifacial solar modules vertically and at a distance parallel to each other, wherein a reflector is arranged between the parallel solar modules.

SUMMARY

It is therefore an object of the present invention to provide a PV system in which a plurality of bifacial PV modules can be mounted in a vertical arrangement and which satisfies the specific requirements of bifacial modules. For this purpose, in particular a supporting structure is intended to be provided which not only can be manufactured cost-effectively, but also permits rapid and therefore reasonably priced erection of the PV system. In addition, the supporting structure is intended to have sufficient stability in typical weather conditions.

The invention is furthermore based on the object of improving the efficiency of converting sunlight into electrical energy for PV systems.

In order to achieve these objects, a photovoltaic system is provided having one or more features according to the invention. In particular, it is therefore provided, according to the invention, in order to achieve the object in a photovoltaic system of the type mentioned at the beginning, that the supporting structure has a plurality of posts which are secured, in particular anchored, on or in the ground, wherein cross-members are secured to the posts, said cross-members in each case connecting two adjacent posts to each other, and wherein in each case two posts and two cross-members define a substantially rectangular mounting area in which at least one PV module is arranged.

Accordingly, a mounting area according to the invention can receive one PV module or a plurality of PV modules, wherein further divisions of the mounting area, for example by means of additional cross-members and/or vertically running intermediate posts, can also be provided. The mounting area according to the invention can be considered to be substantially rectangular, in particular whenever the mounting area is suitable for receiving a PV module having a rectangular outer contour. It can therefore be provided in particular according to the invention that in each case two posts and two cross-members define a mounting area in which at least one PV module is arranged, wherein edges of the posts and cross-members which are aligned with the PV modules and therefore bound the mounting area are preferably arranged uniformly, at a distance from outer edges of the at least one PV module.

In the majority of erection situations, it is advantageous if the plurality of bifacial photovoltaic modules are arranged standing vertically on the supporting structure.

In other words, the invention therefore provides a supporting structure in which posts and cross-members are connected to one another at preferably regular distances and preferably at right angles, and therefore in each case two posts and two cross-members define a rectangular mounting area, into which a bifacial PV module is inserted suspended vertically. The PV modules can therefore collect sunlight on both sides in order to convert same into electrical energy.

According to the invention, it is advantageous for a high degree of rigidity of the supporting structure if at least individual cross-members are secured on both sides to posts by securing means. An expedient securing of the cross-members within the context of the invention can be realized here in particular by screw connections, in particular drilling screws or threaded screws, by rivets, pins, and by welding, adhesive bonding or by a simple interlocking connection.

It is advantageous here that a PV system according to the invention can be produced cost-effectively and can be erected efficiently and therefore cost-effectively. At the same time, the supporting structure according to the invention ensures a high degree of stability, in particular against wind loads, and efficient use of the active surfaces of the bifacial modules.

According to the invention, the foundation of the supporting structure can be provided, for example, by means of anchoring in the ground. This can be realized, for example, by means of ground anchors, ground screws, pile-driving posts or concrete foundations, wherein guy wires can additionally be provided. If anchoring in the ground is to be avoided, for example when erecting the PV system on landfill areas, a foundation of the supporting structure can also be achieved according to the invention on the ground by putting weights on the posts. Furthermore, the posts and the cross-members can be configured in the form of longitudinal profiles, for example as aluminum extruded profiles, as a result of which a particularly economical use of material and therefore a lightweight supporting structure are made possible. According to the invention, the supporting structure can be produced, for example, from C-, S-, U-, Σ- or Ω-profiles, in particular from combinations of such profiles. For example, oblique and/or round shaped elements can also be provided here on the posts and/or cross-members in order to minimize the shadowing of the PV modules. A further configuration according to the invention provides posts and/or cross-members from hot- or cold-rolled steel, preferably provided with anti-corrosion protection.

According to the invention, the object can also be achieved by further advantageous variations as described below and in the claims.

For example, it is advantageous according to the invention if, in the use position of the PV system, the posts are oriented substantially vertically and/or the cross-members are oriented substantially horizontally. By means of such an orientation of the posts and cross-members, it can be ensured in particular that edges of the posts and cross-members which bound the individual mounting areas, said edges being aligned with the PV modules, are preferably arranged uniformly, at a distance from outer edges of rectangular PV modules of the PV system. By this means, for rectangular PV modules which are typically commercially available, an economical use of material for the supporting structure and/or good surface use can be achieved since the distance of the posts and cross-members from the PV modules can be selected to be as small as possible. Unlike in conventional PV systems for unifacial PV modules, it is in particular avoided here that posts or cross-members run below or behind a PV module, which would result in an undesirable shading of the PV modules.

In addition, it can be provided in a PV system according to the invention, for example, that a plurality of PV modules, in particular up to four PV modules, are arranged one above another in a vertical direction. By means of the provision of a plurality of rows of PV modules running one above another, the usable active surface can therefore be increased as a whole without additional posts having to be erected. According to the invention, the provision of more than four PV modules arranged one above another has the disadvantage according to the invention that the wind load considerably increases, and therefore the foundation of the posts has to be configured in a substantially more complicated and therefore expensive manner. The invention therefore provides limiting the number of modules arranged one above another to four. According to the invention, the optimum of the number of lines of PV modules arranged one above another is between two and three.

According to the invention, it is furthermore preferred if horizontally adjacent PV modules are arranged offset with respect to one another in the vertical direction. By means of this configuration, which is untypical of classic systems, a particularly efficient design of the supporting structure is made possible. This applies in particular whenever the vertical offset between horizontally adjacent PV modules is at least the height of one cross-member. Cross-members can therefore be mounted lying vertically one above another on the posts, which is advantageous for numerous configurations according to the invention of the supporting structure. In particular, the respective securing points of horizontally adjacent cross-members to a post can therefore be arranged lying vertically one above another. This permits the efficient use of flanges and tabs on the posts, as will be explained more precisely.

For a particularly efficient erection of the posts of the PV system, it can be provided according to the invention that the posts are divided at least into a securing section which is connected to the ground and a holding section which is connectable or is connected to the securing section. The holding section extends here above the securing section. It is of advantage that the foundations of the securing section can be provided in or on the ground initially independently of the holding section. This is advantageous, for example, whenever the foundations of the securing section are intended to be provided by the latter being rammed into the ground. For this purpose, the securing section can be configured in particular in the form of a ramming profile, and therefore the securing section has sufficient rigidity for ramming-in purposes.

Both the holding section and the fastening section can be configured according to the invention as a longitudinal profile, preferably made of metal. It is of advantage here that in particular different profiles can be combined with one another. For example, a C-, U- or Σ-profile, which is suitable for ramming-in purposes, can be combined as a securing section with an S- or Ω-profile, which are both less suitable for ramming-in purposes, as a holding section of the post. Furthermore, it can also be provided that the holding section is designed to be less strong than the securing section in order to save material. This can be achieved, for example, by a different choice of profile, in particular different profile dimensioning, or by less strong material.

After the foundations of the securing section have been provided, the holding section can be aligned on the securing section and fixedly connected thereto, for example by means of screws with a self-tapping thread, which can be screwed into, possibly predrilled, holes. For this purpose, it is preferred according to the invention if corresponding contact surfaces are in each case formed on the securing section and the holding section. The two sections can lie against each other at said contact surfaces and can therefore overlap. This creates a possibility of compensating for deviations in the height of the securing section by aligning the holding section with respect to the securing section. For this purpose, the holding section, in particular when lying with the contact surface against the securing section, can be configured to be displaceable along the longitudinal direction of the securing section.

According to the invention, the overlap between the securing section and holding section can additionally be configured to be rotatable. The two sections of a post, when the corresponding contact surfaces lie against each other, can therefore be rotated or can be in a rotated state with respect to each other. This can be achieved, for example, by a plane configuration of the contact surface such that securing section and holding section lie back to back against each other in the mounted state. By means of a rotatable configuration of the overlap, the longitudinal axes of the two sections of the post can be rotated in relation to each other, thus achieving an improved compensation of skew orientations of the securing section that may arise when the foundations of the latter are being provided.

According to the invention, it is furthermore advantageous if the individual PV modules, i.e. in particular outer edges of the PV modules, are arranged at a distance from the posts and/or cross-members. Shading of the active surface of the PV modules by means of posts and/or cross-members can therefore be avoided. In this connection, it is preferred according to the invention if the spacing is selected only to be of a size such that shading up to an angle of incidence of at maximum 75° is prevented. This avoids an excessive amount of space being required for the spacing, and therefore efficient use of the area is permitted. In general, it is preferred according to the invention if the PV modules are mounted centrally with respect to the outer edges of posts and/or cross-members. A minimum shading of the two sides of the bifacial PV modules can thereby then be achieved.

An angle of incidence is understood here and below as meaning the angle which an incident ray of sunshine encloses with a perpendicular of an active surface of a PV module. A vertical incidence of light on the active surface of a PV module therefore corresponds to an angle of incidence of 0°. Since the PV modules are arranged vertically, the angle of incidence can be in particular a lateral insolation angle.

A highly efficient PV system can be achieved according to the invention if the active surfaces of the PV modules are arranged at a distance from the posts and/or cross-members. This makes it possible substantially to avoid that, in the event of an oblique incidence of light, the posts or cross-members shadow border regions of the active surfaces of the PV modules, which would have a negative effect on the efficiency of the system.

According to the invention, it is particularly advantageous if the active surfaces of the PV modules are at a distance here from the posts in such a manner that, at least up to an angle of incidence of 20°, particularly preferably at least up to an angle of incidence of 30°, shading of the active surface by means of posts is prevented. Alternatively or additionally, it can be provided that the active surfaces of the PV modules are arranged at a distance from the cross-members in such a manner that, at least up to an angle of incidence of 25°, preferably at least up to an angle of incidence of 30° or even 40°, shading of the active surface by means of cross-members is prevented.

An even more compact PV system can be achieved according to the invention in that the active surfaces of the PV modules on mutually opposite sides are arranged asymmetrically at a distance from posts and/or cross-members. For example, it can be provided that individual PV modules are arranged at a distance from the posts such that, for northern directions, at least up to an angle of incidence of 20°, preferably at least up to an angle of incidence of 30°, with respect to the active surface of the PV module, shading of said surface is prevented, while, for southern directions, at least up to an angle of incidence of 45°, preferably at least up to an angle of incidence of 60°, with respect to the active surface of the PV module, shading of said surface is prevented.

In the case of horizontally running cross-members, it suffices, according to the invention, if the PV modules are arranged at a distance only from those cross-members which run above the PV module. Shading of the active surface by cross-members running thereabove is therefore avoided. By contrast, for modules which are arranged above a horizontally running cross-member, there is no risk of shading by said cross-member running below the module since the directly incident sunlight strikes against the active surface obliquely from above. As a result, according to the invention the active surface of a PV module above a horizontally running cross-member can therefore approach close to the latter in order to minimize the space required by the PV system in the vertical direction.

If the PV system is intended to be erected at locations which are particularly prone to wind, it can be provided according to the invention that the PV modules are suspended on the supporting structure so as to be pivotable about an axis of rotation. It is advantageous in this connection if the axis of rotation runs approximately parallel to the cross-members since pivotability can therefore be ensured with a compact mounting area. Pivotability of the PV modules about an axis of rotation can be achieved, for example, by the PV modules being suspended pivotably only on upper cross-members of the supporting structure. Owing to the pivotability, in the event of strong winds the PV modules can move out of the plane formed by the posts. The wind can therefore blow virtually unobstructed through the resulting gaps in the mounting areas, as a result of which the wind load acting on the supporting structure is considerably reduced. It is of advantage here for the supporting structure as a whole to be configured to be less stable, and therefore, for example, the posts can be designed to be less stiff and therefore overall material costs can be saved.

In order to permit as simple an assembly of the PV system as possible, the invention makes provision for holding surfaces to be formed on the posts, to which holding surfaces an associated cross-member can be flatly secured. By means of the flat lying of a cross-member against a holding surface, forces and moments introduced by the cross-member can be effectively absorbed by the post.

According to the invention, the holding surfaces can be designed particularly simply as flanges on a profile and/or as tabs on an opening, for example introduced into an outer surface of a profile. For this purpose, it can also be provided that holding surfaces on one side of a post are designed as flanges and on the other side as tabs. Tabs or flanges are therefore considered according to the invention to be alternatives, wherein it is preferred according to the invention both for tabs and for flanges if they protrude at right angles from the posts and/or run in the direction of a plane, which is formed by the PV modules, preferably run offset with respect to said plane. Furthermore, bores, elongated holes or the like can be provided on tabs and/or flanges in order to facilitate the securing of the cross-members by means of screws or the like.

According to the invention, a flange serving as a holding surface can run in particular along an entire holding section of a post; the flange can therefore be part of a profile; however, it can also have been attached retrospectively to a post, for example by welding. When profiles having only single flanges at their ends are used, for example an S profile, according to the invention additional angle connectors which can be screwed onto a profile can be provided. Therefore, when a cross-member is secured to a single flange in conjunction with an angle connector, a closed, encircling force flux can be formed and therefore the rigidity of the structure can be increased. In addition, according to the invention, flanges can also be provided on posts merely in order to increase the flexural rigidity of the posts.

According to the invention, the shape of a tab can be predetermined by the shape of the associated opening in a profile, for example by the openings and associated tabs being produced cost-effectively on the posts by processes, such as punching or laser cutting in conjunction with bending or shaping. In this connection, it is also possible for a pair of tabs to be formed from an opening, said pair of tabs being arranged on both sides of the opening in order to permit a cross-member to be gripped on both sides.

The robustness and rigidity of the supporting structure can be increased further, according to the invention, if the holding surfaces are formed in pairs. A pair of holding surfaces can then grip a cross-member, which has been pushed between said holding surfaces, on both sides, and can therefore further improve the dissipation of forces. In order to make it easier for a cross-member to be surrounded on both sides by holding surfaces, it is also advantageous if the cross-members are designed to be narrower than the post, in particular narrower than a distance between holding surfaces which are formed in pairs.

Alternatively or additionally, it can also be provided to secure cross-members to the posts by means of angle connectors. In this connection, according to the invention, angle connectors are preferred which have holding surfaces on both sides of a cross-member to be secured, said holding surfaces being flatly connectable to a post.

A further possible refinement of the invention makes provision for plug-through openings to be formed on the posts in order in each case to receive a cross-member or an end thereof. The formation of plug-through openings has the advantage that tilting of the posts in relation to one another and associated fluctuations in the distances between the posts can be easily compensated for by the cross-members being plugged to a greater or lesser extent into the plug-through openings.

It goes without saying that it is advantageous in this connection for a simple assembly if the plug-through opening is configured to be somewhat larger than the cross-member to be received by it. However, according to the invention, it can be provided in particular that the plug-through opening is at least 1.25 times, preferably at least 1.5 times, the height of a cross-member in the vertical direction. A possibility is therefore provided of at least partially compensating for different height positions of the posts, for example in undulating terrain, by the cross-members being mounted at different heights.

In contrast to plug-through channels formed laterally on outer surfaces of the posts by means of secured angle connectors, plug-through openings also afford the advantage that they can be arranged, according to the invention, centrally with respect to the posts. The effect which can therefore be achieved in a particularly simple manner is that the PV modules are placed centrally with respect to the posts and/or cross-members. According to the invention, such an arrangement is preferred because of minimized shading on both sides of a PV module.

When plug-through openings are used, it is particularly advantageous if at least the holding section of the post is designed in the form of an omega profile. When an omega profile is used, two horizontally adjacent cross-members can then be gripped on both sides by the two open ends of the omega profile, which ends can be formed by a parallel pair of flanges running along the profile. A closed force flux can thereby be formed in the omega profile. In this case, individual cross-members can be guided through plug-through openings formed in side surfaces of the omega profile. In this refinement, cross-members running on the left and right of a post configured as an omega profile can therefore be secured at a pair of flanges running on one side of the post. A configuration of the supporting structure which is particularly simple to mount and is nevertheless robust is therefore designated.

A similarly robust connection between posts and cross-members with the use of plug-through openings can be achieved according to the invention if at least the holding section of the post is designed in the form of a C- or U-profile. In this case, plug-through openings can be formed on side surfaces of the respective profile, said plug-through openings having bent-up tabs which, for their part, provide holding surfaces for the mounting of cross-members.

If two cross-members running on the left and right of a post are intended to be mounted at a tab, it is advantageous if the height of the tab is more than 1.25 times the height of a cross-member, and is preferably at least 1.5 times the height of a cross-member. By means of this configuration, a tab, or a pair of tabs, of a plug-through opening, is therefore of a height sufficient to hold two cross-members. A plug-through opening which is additionally configured to be higher may nevertheless be useful according to the invention in order to permit improved compensation for the mounting height of cross-members.

In one refinement of the invention, plug-through openings can have one or more tabs, as already previously described, which provide holding surfaces for the mounting of a cross-member, preferably two cross-members. This results in diverse configurations, also in conjunction with omega profiles. In contrast to angle connectors to be secured separately, tabs afford the advantage of a lower outlay on mounting since, unlike angle connectors, they do not have to be secured to the profiles. In addition, bent-up tabs are generally connected non-rotatably to a vertical surface of a profile, as a result of which a high torsional rigidity of the supporting structure is achieved in a simple manner.

In general, in particular in all of the previously described configurations of plug-through openings, it can be provided in particular that individual plug-through openings have at least two times, in particular at least three times, the height of a cross-member. This configuration makes it possible to place a cross-member, or in particular two cross-members, in a plug-through opening, with the mounting height of the cross-member, or of the cross-members, with respect to the plug-through opening being able to be variable, i.e. being able to be varied in particular during the mounting, because of the larger configuration of the plug-through opening. A height compensation can thereby be achieved, which is of advantage in particular in undulating erection terrain.

Alternatively to the accommodation of at least two cross-members in a plug-through opening, a further refinement of the invention makes provision for only one cross-member to be placed in a plug-through opening, while a further cross-member is mounted on a side of the post which lies opposite the plug-through opening and does not have a plug-through opening and by means of holding surfaces formed on the post. It can be provided in this connection in particular that the cross-member which is guided through the plug-through opening is mounted on the side of the post which lies opposite the plug-through opening at the same holding surface as the further cross-member. In other words, according to a refinement of the invention, it can be provided in particular that a cross-member which is plugged through a plug-through opening and a further cross-member are secured to one holding surface.

A further refinement according to the invention makes provision for the posts to have a profile with a C-shaped or U-shaped basic shape, at least in the or a holding section. In this connection, additional holding surfaces can be designed as flanges at the ends of the profile. The flanges can have been formed either during the production of the profile or can have been secured retrospectively to the profile.

According to yet another refinement according to the invention, it can be provided that the posts have a profile with a Z-shaped or S-shaped basic shape at least in the or a holding section, wherein additional holding surfaces are designed as flanges at the ends of the profile. S-shaped profiles are sometimes also known in the trade as "Z-plus" profiles. "Additional holding surfaces/flanges" should be understood here, as also already previously in the case of the C- or U-shaped profiles, in such a manner that the basic shape of the profiles is already provided without the flanges, even if the latter are already produced during the production of the profile.

For a particularly simple and nevertheless robust mounting of the PV modules, it is preferred according to the invention if the PV modules are secured to the cross-members. If modules are mounted in landscape format/portrait format, the modules are accordingly held along their longer/shorter sides. For this purpose, special holding elements can be provided according to the invention. Said holding elements preferably provide groove sections into which a border of the respective PV module is plugged or can be plugged, preferably dispensing with a force-fitting connection. The groove sections can be lined here with a plastics or elastic material, preferably EPDM, in order to protect the PV modules from damage. Furthermore, it can additionally be provided to adhesively bond the PV modules to the holding elements in order to prevent slipping of the PV modules in the groove sections.

According to the invention, the holding elements can be manufactured, for example, as cold-formed steel parts, preferably of corrosion-resistant steel and/or with anti-corrosion protection, or from plastic or from light metals, such as aluminum, and can in particular have a coating of rubber. The holding elements can furthermore be produced in the form of profiles or as injection molded or diecast p arts.

According to the invention, the PV modules are gripped in the region of the groove sections, preferably on both sides, by the respective holding element, and therefore secure holding of the PV modules can be ensured.

It goes without saying that holding elements, as previously described in an analogous application of the invention, can also be used for securing PV modules to the posts.

Particularly preferably, in each case two opposite groove sections are formed on the holding elements. An individual holding element can therefore hold two opposite PV modules. It is advantageous in this connection if the two groove sections run in a common plane. Additionally or alternatively, it can also be provided that the two groove sections are each arranged centrally with respect to lateral outer surfaces of the holding element. By means of such configurations, a central positioning, preferred according to the invention, for all PV elements with respect to the posts and/or cross-members is substantially facilitated.

Furthermore, it can also be provided that the holding elements each have a, preferably rectangular, cross-sectional tapered portion. At the point at which the cross section changes, a stop can therefore be formed on the holding element. The holding element can therefore be pluggable or can be plugged into an opening, which is formed on a cross-member, as far as a defined plug-in depth. For this purpose, it can accordingly be provided according to the invention that the cross-members have, in particular centrally arranged plug-through openings corresponding to the holding elements. Said plug-through openings of the cross-members can be formed in particular in such a manner that slipping of the holding elements in the longitudinal direction of the cross-member is prevented.

A substantial advantage of this configuration consists in that, for robust positioning of the PV modules, it is sufficient to secure the holding element in the region of an upper groove on the cross-member receiving the holding element, for example by means of a screw connection; additional securing in the region of the second, lower groove is therefore unnecessary. Thus, not only is a mounting outlay saved, but the holding elements can be designed to be narrower in a respective lower region, which surrounds a lower holding groove, than in an upper region, which is advantageous in order to avoid shadowing of the PV modules.

For positionally secure and tilting-free mounting of the holding elements, it is also advantageous according to the invention if a contact surface is formed on the holding element, by means of which contact surface the holding element lies flatly against the cross-member.

A further optimization of the holding elements according to the invention makes provision for said holding elements to have a bevel on a lower side, and therefore shading of a PV module which is inserted into a lower groove of the holding element can be avoided.

As an alternative or additional configuration to separate holding elements, it can be provided according to the invention that groove sections into which a respective PV module can be plugged are formed on the cross-members. Said grooves can be formed, for example, also just on an upper side of a cross-member and/or can in particular extend over the entire length of a cross-member. It is of advantage here that the PV modules during the mounting can be inserted directly into the grooves of the cross-members, and therefore the number of holding elements to be mounted can be reduced. This approach can reduce the mounting outlay and therefore save costs.

Analogously to the holding elements, it can also be provided for cross-members that cross-members have a bevel on a lower side. Large angles of incidence can therefore also be ensured in each case for border regions of the active surface of the PV module without shading by the respective cross-member.

The invention has furthermore recognized that it may be advantageous to configure the supporting structure in such a manner that an, in particular agricultural, cultivation of the area on which the PV system is to be erected, in particular of open cultivation spaces between individual rows, continues to remain possible. For this purpose, the invention makes provision for an open space to be kept free between the ground and a lowermost cross-member of the supporting structure. According to the invention, said open space can have a height of at least 50 cm, preferably at least 60 cm, particularly preferably at least 1 m. It goes without saying that the open space is therefore interrupted only by the required posts.

When the PV modules are erected in rows, it can be provided in particular in this connection that the rows of the PV system are arranged at a distance in such a manner that there is an open cultivation space having a width of at least 6 meters, at least 8 meters or at least 10 meters between the rows.

For as efficient a use of a surface as possible, i.e. in particular for maximum energy generation per surface, it can be advantageous according to the invention if the PV modules substantially form a plane with the supporting structure. Accordingly, for this purpose, the posts can be erected along a substantially straight line. From a certain minimum width of the erecting surface, the PV modules can also be arranged in a plurality of rows. It is advantageous in this connection if said rows are arranged, preferably uniformly, at a distance from one another. According to the invention, a minimum distance from a row adjacent in the sun direction can then be selected, depending on the height of a row of the PV system, in such a manner that shading of the active surfaces of the PV modules by the adjacent row is substantially prevented. Rows having different heights, i.e., for example, having a different number of PV modules arranged one above another, can also be provided here.

In a particularly advantageous refinement of the invention, it can be provided that the PV modules are oriented substantially in a north-south direction. In a north-south orientation, the surface normals of the two active sides of a bifacial PV module are respectively oriented to the east and west. In this case, according to the invention, angular deviations of +/−30° can be provided, and therefore the orientation is described as running "substantially" in a north-south direction. By means of such configurations, it is possible with the PV system to obtain a current/day curve characteristic as described at the beginning which specifically does not have peak power around midday. However, PV systems according to the invention can be used in an advantageous manner in a multiplicity of further orientations with respect to the direction of the sky.

According to the invention, the surface use of the PV system can be optimized with still acceptable losses in the efficiency of the energy conversion if a distance between two rows is at least three times, preferably at least four times, particularly preferably at least five times a maximum height of an active surface of the PV system. Therefore, depending on the geographical width of the erection site of the PV system, shading of PV modules by means of an adjacent row can be substantially avoided, in particular in the morning and in the evening. For example, the maximum height of an active surface of the PV system can be defined by a vertical distance between a highest and a lowest point, in each case within the active surfaces of a row of the PV system (cf. in this respect also the description of the figures).

As is known, shadowing is therefore disadvantageous since the individual cells of a PV module are typically connected in a row to form cell strings and therefore the cell with the weakest exposure limits the actually flowing current. What are referred to as bypass diodes are indeed known in the prior art and are provided as standard in PV modules in order to minimize the effects of partial shading of the active surface of a PV module. However, the exclusive use of bypass diodes for minimizing the effects due to shading is associated with considerable disadvantages. For example, a powerful generation of heat occurs as soon as a bypass diode is connected in order to electrically bridge a shaded region of an active surface. However, such an approach is unacceptable specifically in the case of PV systems within the context of the invention in which shading can be expected daily, since frequent heat generation can have a negative effect on the service life of the PV modules. A further disadvantage consists in that, despite bypass diodes being present, many inverters used on the market abandon an operating point which is unfavorable for the PV module, and therefore further power losses occur in the PV modules which are connected to the inverter concerned.

In order to increase the efficiency of the energy conversion of a PV system, the features of the second independent claim are therefore alternatively provided, said claim being directed toward a PV system having at least one bifacial PV module. In particular, for a photovoltaic system having at least one bifacial PV module, which photovoltaic system can be developed in particular by the previously described refinements of the supporting structure, it is therefore provided, according to the invention, for achieving the object just mentioned that an electrical connection of active surfaces of the PV system, in particular of all of the active surfaces, is selected in such a manner that active surfaces of the electrical connection that are situated at different heights can be operated at different electrical operating points. In this connection, it can be provided in particular that upper (i.e. arranged at the top) active surfaces are connected electrically in parallel to lower (i.e. arranged at the bottom) active surfaces. Alternatively or else additionally, upper active surfaces can be connected in series to one another and/or lower active surfaces can be connected in series to one another.

According to a further refinement of the invention, electric, module-free feedback, for example by means of cables, can be provided for such connection, and therefore no PV modules thus interrupt the feedback. Such electric, module-free feedback can be designed in particular in a corresponding manner to PV modules connected in series. Such feedback has hitherto been avoided in conventional PV systems having unifacial PV modules for cost reasons and also for technical reasons. However, the invention has recognized that the enormous influence of shadowing on PV systems having vertical PV modules can require such feedback if an optimum electrical connection of the PV modules is to be ensured.

In addition, the invention has recognized that, for use of upright, bifacial PV modules for a PV system, great advantages are afforded if all of the active surfaces which are situated at different heights can be operated at different operating points as long as there is only a deviation from said rule in border regions of the PV system.

Such a configuration means that in particular currents which flow through active surfaces, arranged at different heights, of one or more PV modules of the PV system can vary. This configuration therefore makes it possible to avoid that, for example, shading of a lower active surface limits the current production in an upper active surface, as is the case if upper and lower active surfaces of one or more PV modules are electrically connected in series.

In addition, for some time, rectangular bifacial PV modules have been commercially available which have two electrically separate active surfaces, wherein typically each of said active surfaces has a plurality of cell strings, and the electrical separation runs parallel to the shorter side of the module. The invention provides here to erect such bifacial PV modules with electrically separate active surfaces in portrait format, and therefore upper and lower active surfaces within the context of the invention are formed.

Within the context of the invention, the statement that the active surfaces are electrically separated from one another can be understood here in particular as meaning that said active surfaces are not connected to one another in a series connection; by contrast, an electric parallel connection of the active surfaces, even within the PV module, can be provided.

The invention furthermore provides to operate the respectively upper active surfaces of such bifacial PV modules in a manner connected electrically in parallel to the respectively lower active surfaces, and therefore the upper active surfaces can operate at an electrical operating point which differs from that of the lower active surfaces. If one of the lower active surfaces is already shaded, the current flow through the upper active surface or through the upper active surfaces therefore remains unaffected since there is a current path parallel to the lower shaded active surface through the upper active surface(s). An electrical operating point within the context of the invention can therefore be defined in particular by an electric current which flows through the corresponding active surface.

It goes without saying that, within the context of the invention, active surfaces, i.e. in particular PV modules as a whole, which are arranged at approximately the same height can be connected in series. If active surfaces of the PV system which are arranged at approximately the same height are connected in series, an electrical line according to the invention can be referred to.

One refinement of the invention therefore provides creating electrical lines which are electrically separated from one another by series connection of active surfaces, arranging said electrical lines at different heights and preferably operating the electrical lines in a manner connected electrically in parallel. The throughflow currents in the individual electrical lines can therefore vary, which is equivalent to the statement that active surfaces in different electrical lines can be operated at different operating points, i.e. in particular with different currents.

One possible realization of a PV system according to the second independent claim having an upper and a lower active surface which can be operated at different operating points therefore consists in the series connection of PV modules to electrical lines, preferably arranged above one another, and to the operation of said electrical lines in a parallel connection, for example, to a common inverter input or else to different inverter inputs.

The use of electrically separate active surfaces of one or more PV modules by the operation thereof in electrical lines separated from one another can be of advantage in particular in the off-peak times of a day since, if the PV module is partially shaded due to a low position of the sun, typically only the lower electrical line is less effective and the upper electrical line which is then fully irradiated can operate in the normal mode. By contrast, when PV modules as described previously with electrically separate active surfaces are erected in landscape format, the efficiency of the entire module would be reduced since the two active surfaces would be partially shaded.

Since, according to the invention, electrical lines arranged one above another can be operated in a manner connected in parallel, it can be avoided that shading of one line and the associated limiting of the current flow in said line has an effect on an adjacent line (typically lying thereabove). An electrical line according to the invention can already be formed, for example, by one of two active surfaces, which are electrically separated from each other, of a PV module.

According to a further refinement of the invention, high output powers of the PV system can be obtained particularly cost-effectively if an electrical line as described previously is formed by series connection of active surfaces, in particular of at least two bifacial PV modules. As previously explained, the electrical division into electrical lines permits the current flows through different electrical lines to be able to be independent of one another or differ from one another.

An electrical line can therefore be formed in particular by the active surfaces of horizontally adjacent PV modules. For this purpose, it is advantageous within the context of the invention if preferably such active surfaces of PV modules are electrically connected to one another in series and are arranged approximately at the same height. By contrast, within a PV module, it can be advantageous if the active surfaces are electrically connected in parallel, in particular if said active surfaces are arranged lying vertically one above another.

Within the context of the invention, it is particularly advantageous if each electrical line is electrically connected to an inverter input. According to the invention, individual lines can be connected here to inverter inputs of different inverters or to an inverter input of a common inverter.

The invention has therefore recognized that an electrical line can be formed over and beyond a plurality of bifacial PV modules, and therefore it is in particular not necessary for each bifacial PV module to be connected to a dedicated inverter, which can save costs. In this connection, a line can be in particular shorter than a row of posts with PV modules mounted in between. This is because, in a series connection of active surfaces, the electrical voltages generated therein add up, and therefore typically the number of active surfaces to be connected to one another in a row has to be limited.

Without restricting the invention or without contradiction, it can be provided according to the invention, for example in border regions of a row, also to connect active surfaces arranged one above another to one another in series, either within a PV module or over and beyond a plurality of PV modules. Efficient and cost-effective power generation, in particular with an electrical voltage of sufficient magnitude, can then therefore also be ensured in border regions. A partial reduction in the efficiency of the entire PV system when parts of the border regions are shaded is consciously accepted here.

According to a further refinement of the invention, it is considered advantageous if the PV modules, preferably if each PV module, has at least two active surfaces which are electrically separated from each other and are each assigned to different electrical lines. This is because, as a result, even in the event of partial shading of a PV module, a high degree of efficiency in the conversion of radiation striking against the PV module into electrical energy can be maintained, specifically for the entire PV system.

Finally, it can also be provided according to the invention that a PV system having a plurality of electrical lines, in particular two electrical lines, configured according to the invention, with features as described previously, has a supporting structure with features according to the invention as set forth previously.

In order to achieve the object mentioned at the beginning, a specific use of a PV system according to the invention, as described previously, is also provided. In particular, it is therefore provided according to the invention that a PV system according to the invention, in particular as described previously and/or as claimed in one of the claims directed toward a photovoltaic system, is used in such a manner that the PV modules are oriented approximately in a north-south direction during the power generation. In this connection, according to the invention, angular deviations of +/−30° can be provided, and therefore the orientation is described as running "approximately" in a north-south direction. With a north-south orientation of a PV module, the surface normals of the two active sides of a bifacial PV module are respectively oriented to the east and west. By means of this specific use, with a PV system according to the invention a current/day curve characteristic as described at the beginning can be achieved which specifically does not have peak power around midday.

BRIEF DESCRIPTION OF THE DRAWINGS

The invention will now be described in more detail with reference to exemplary embodiments, but is not restricted to said exemplary embodiments.

Further exemplary embodiments emerge from a combination of the features of individual or a plurality of claims with one another and/or with individual features or a plurality of features of the respective exemplary embodiment. In particular, embodiments of the invention can therefore be obtained from the description below of a preferred exemplary embodiment in conjunction with the general description, the claims and the drawings.

In the drawings:

Figure 1:
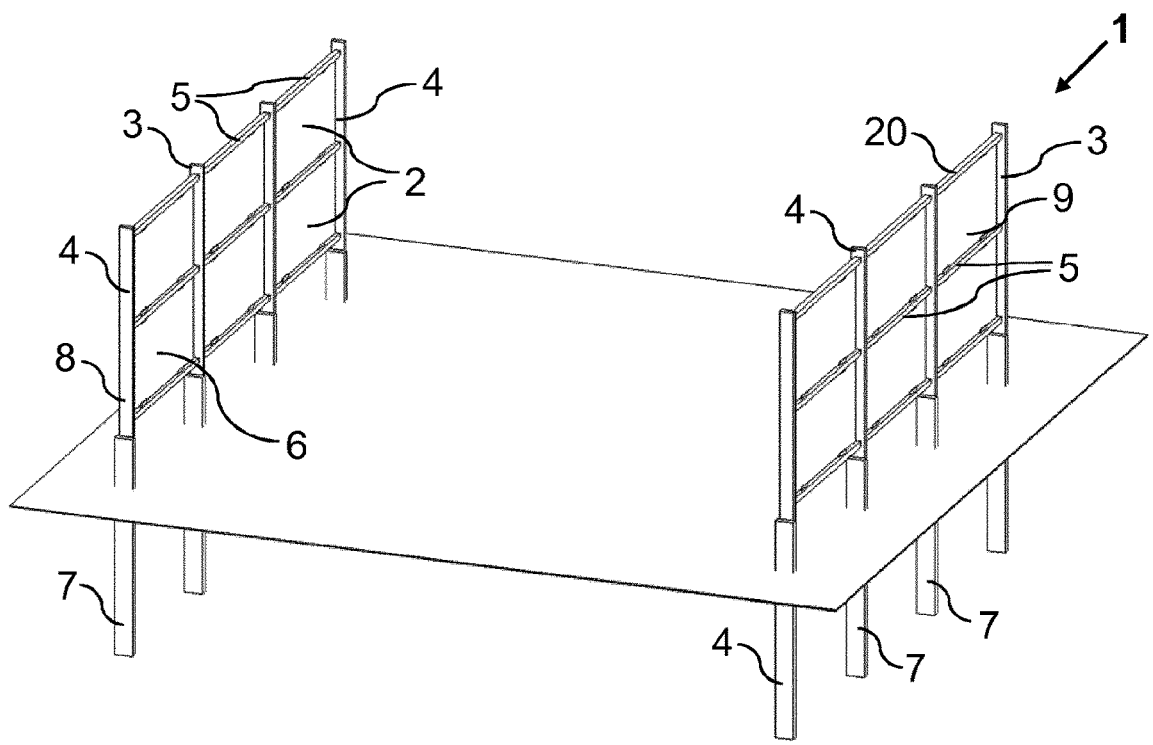
Figure 2:
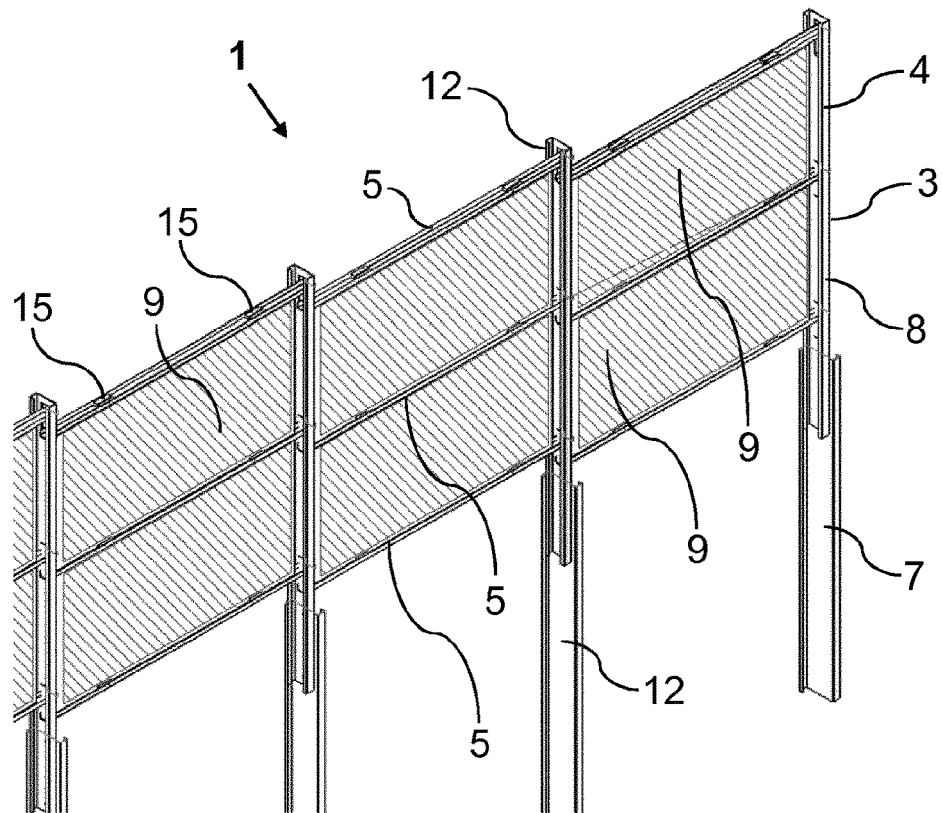
Figure 3:
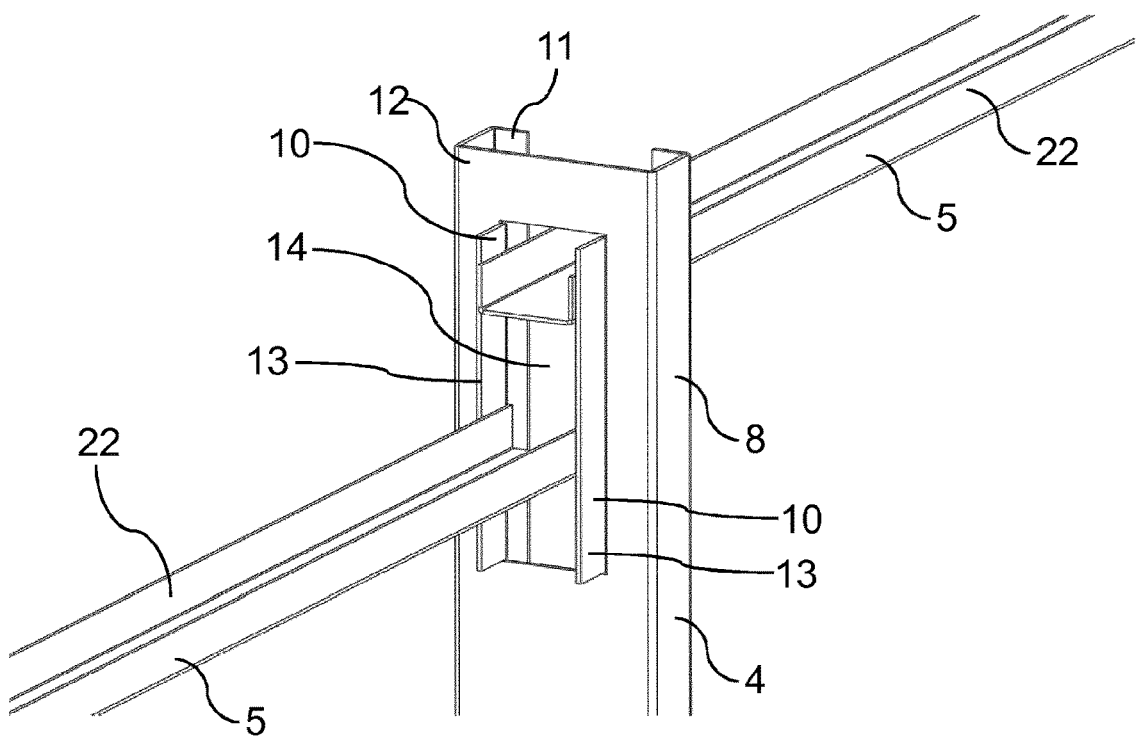
Figure 4:
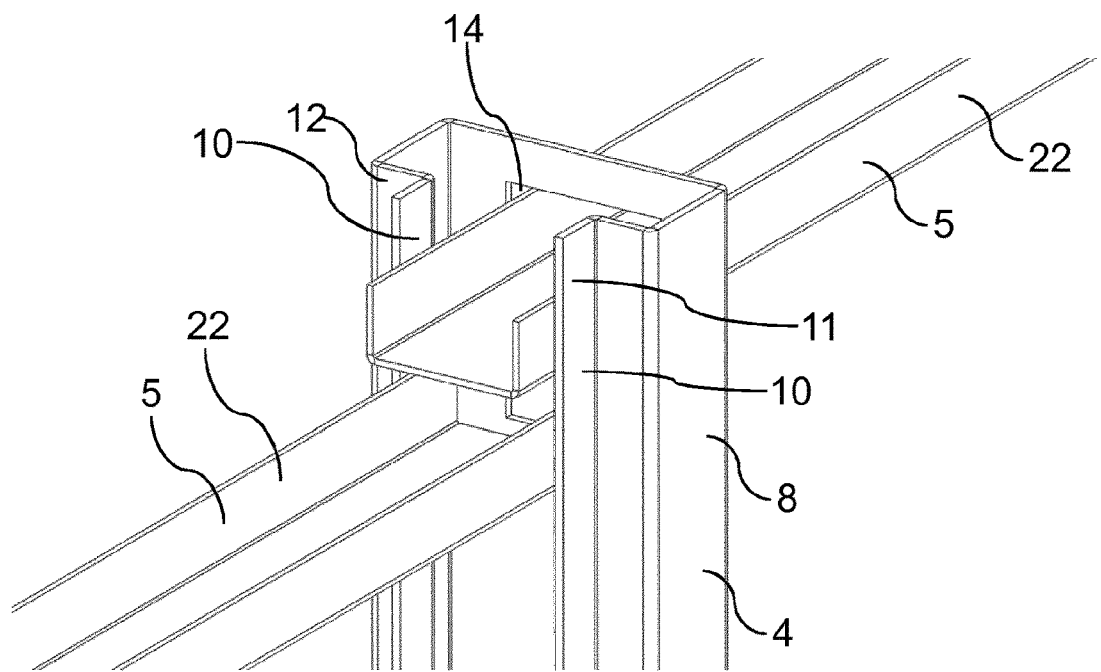
Figure 5:
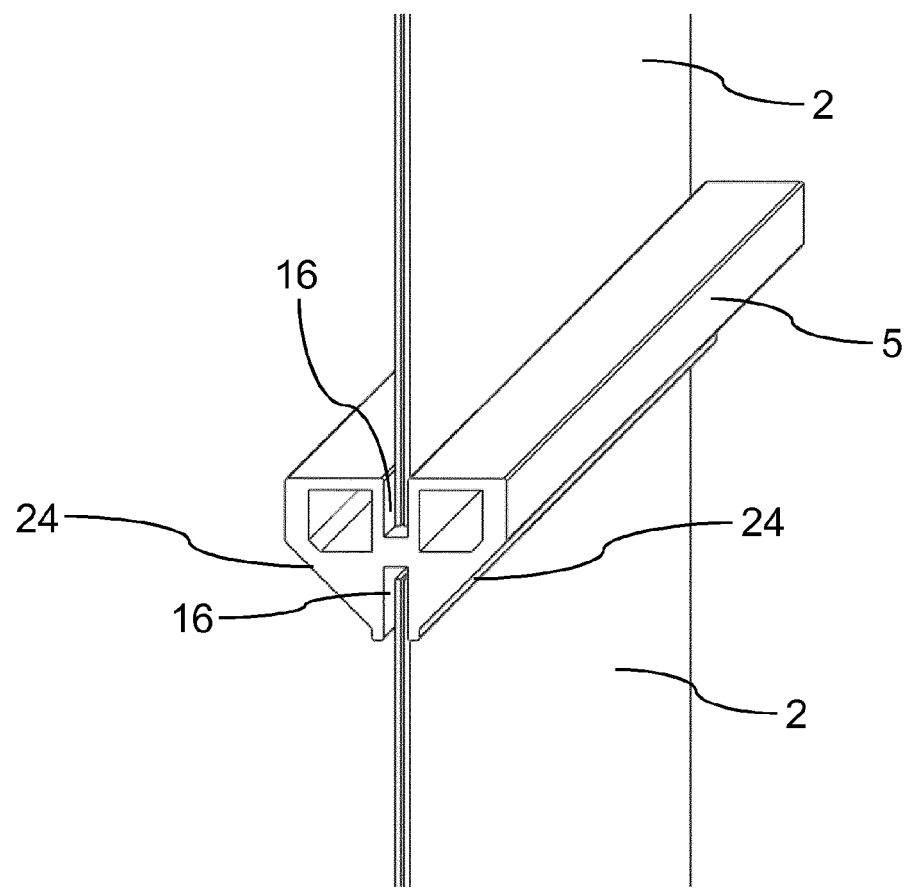
Figure 6:
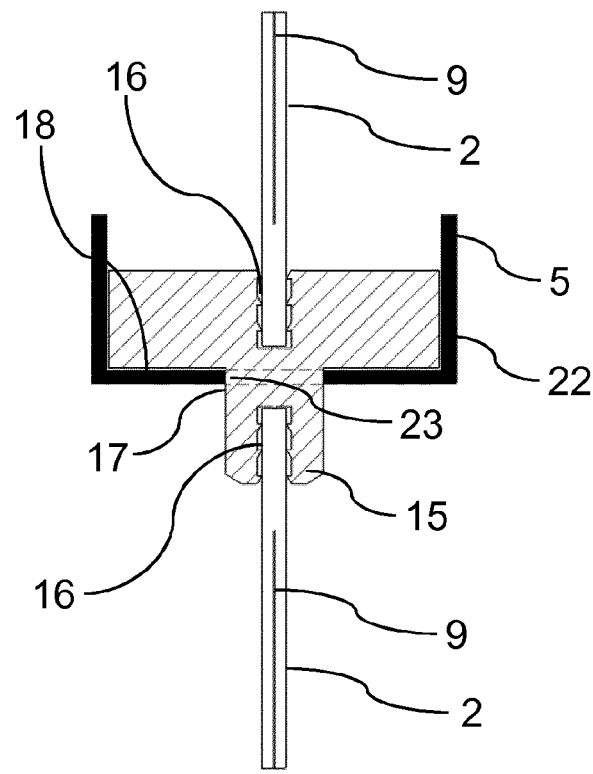
Figure 7:
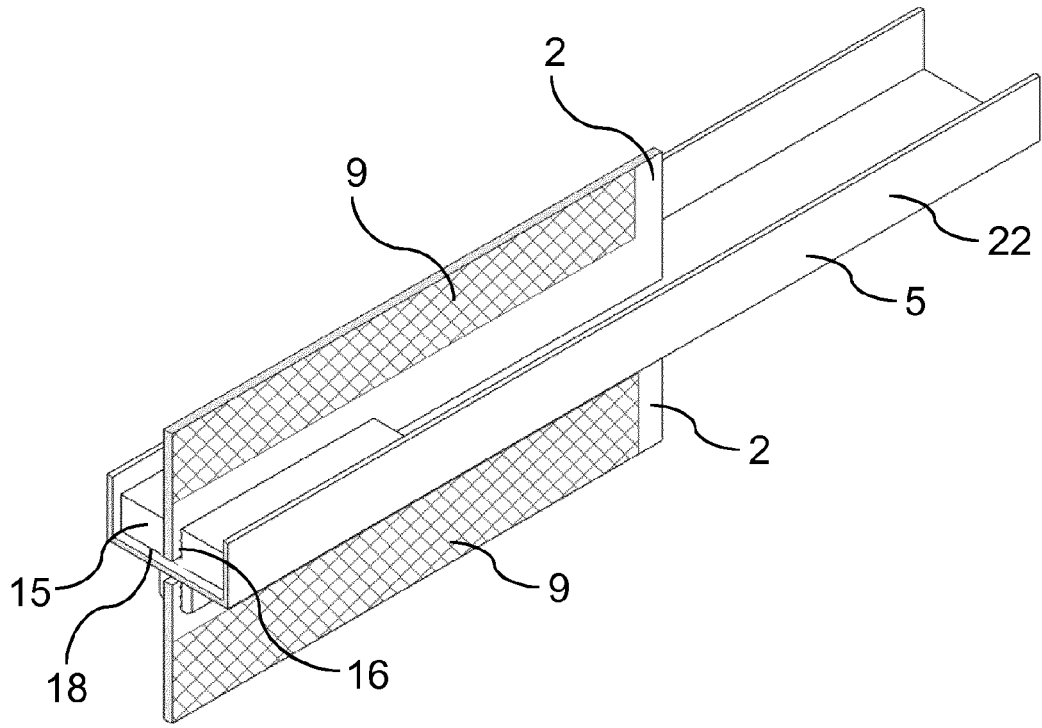
Figure 8:
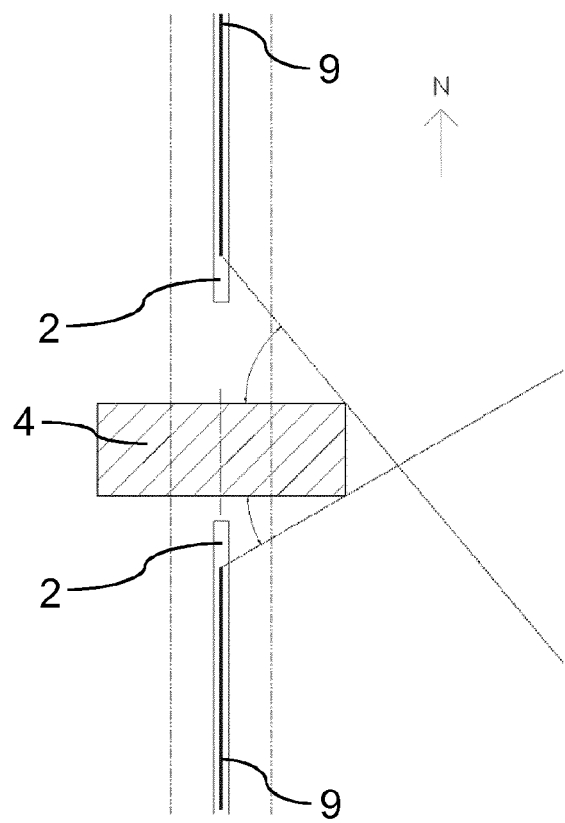
Figure 9:
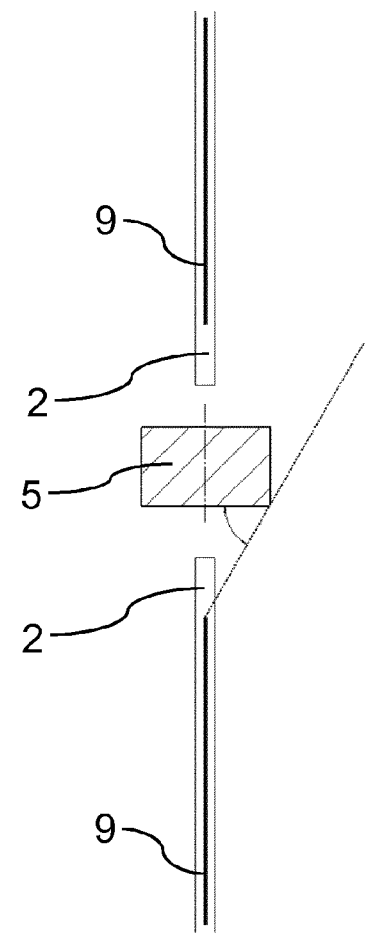
Figure 10:
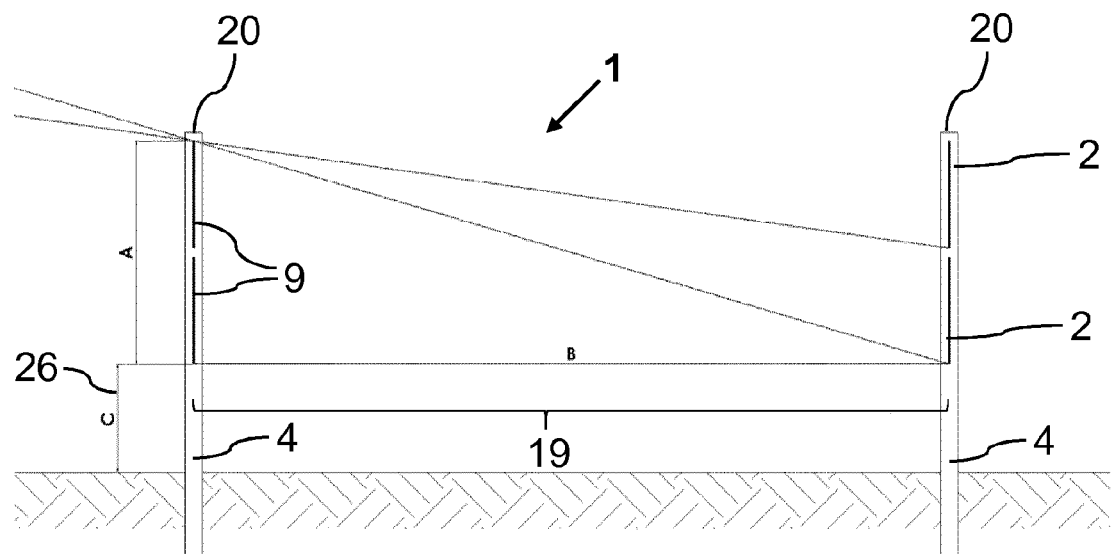
Figure 11:
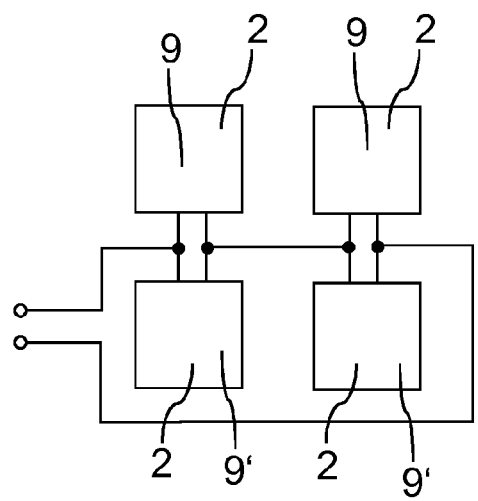
Figure 12:
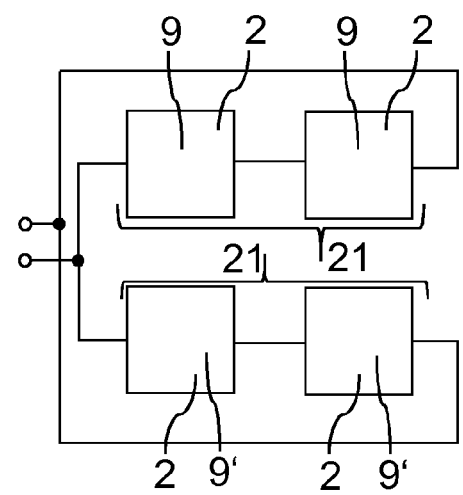
Figure 13:
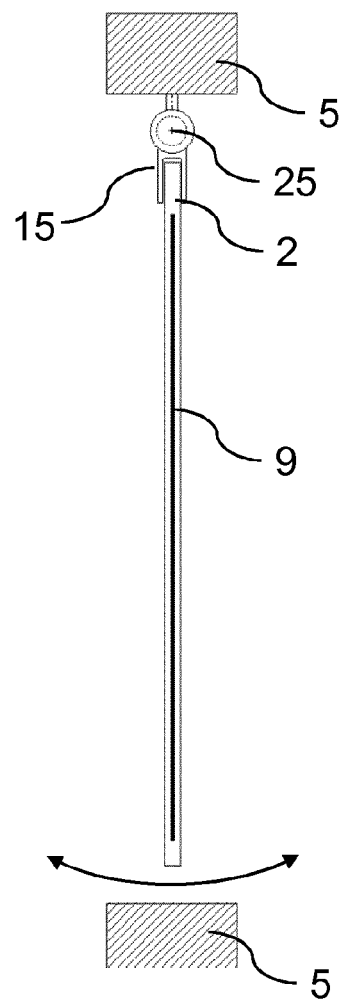
Figure 14:
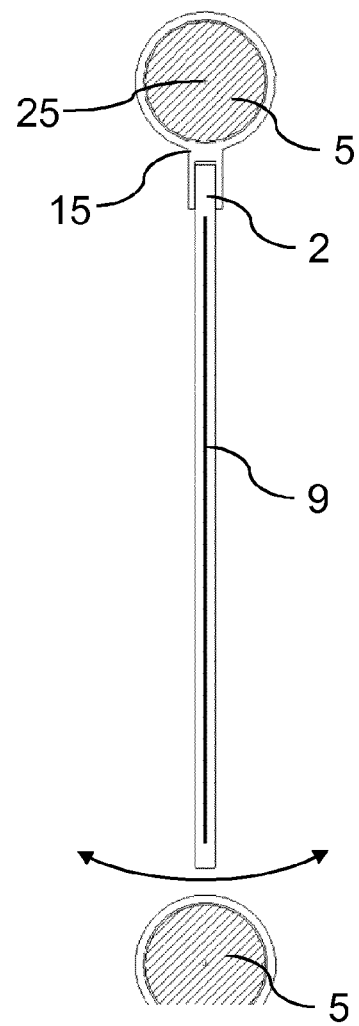

FIG. 1 shows a diametric view of a photovoltaic system according to the invention, FIG. 2 shows a detailed view of a series of posts of the same PV system, FIG. 3 shows a post according to the invention which is configured by means of a C-profile and has two mounted cross-members, FIG. 4 shows a post according to the invention which is configured by means of an omega profile and has two mounted cross-members, FIG. 5 shows a cross-member according to the invention with two opposite groove sections for receiving two PV modules, FIG. 6 shows a cross section through a holding element according to the invention which is placed into a cross-member formed by a U-profile, FIG. 7 shows a perspective view of the holding element from FIG. 7, placed into the U-shaped cross-member, FIG. 8 shows a top view of a post and PV modules which are asymmetrically at a distance therefrom in a manner according to the invention in a northern and southern direction, and also the active surfaces thereof, FIG. 9 shows a lateral cross-sectional view of a horizontally running cross-member and PV modules, which are arranged above and below the latter, and the active surfaces thereof, FIG. 10 shows a side view of a PV system according to the invention with two rows of posts which are erected at a distance, FIG. 11 shows an electrical connection according to the invention of PV modules of a PV system, FIG. 12 shows a further electrical connection according to the invention of PV modules of a PV system, FIG. 13 shows a cross-sectional view of a suspension according to the invention of PV modules on a supporting structure according to the invention of a PV system, FIG. 14 shows a cross-sectional view of a further suspension according to the invention of PV modules on a supporting structure according to the invention of a PV system.

DETAILED DESCRIPTION

In the description below of various embodiments of the invention, elements corresponding in their function obtain corresponding reference signs even if their configuration or shaping differs.

FIG. 1 shows a photovoltaic (PV) system which is delimited in its entirety by 1 and has a plurality of bifacial PV modules 2 which are arranged upright on a supporting structure 3. The supporting structure 3 is formed by a plurality of posts 4 which are erected in a row. More precisely, each post 4 is divided into a securing section 7 and a holding section 8 connected thereto. As is indicated by the horizontal surface which illustrates the ground surface, the supporting structure 3 is anchored in the ground by means of the securing sections 7.

As FIG. 1 shows, a plurality of cross-members 5 run substantially in the horizontal direction between the posts 4. Since the posts 4 are mounted substantially vertically, in each case two adjacent posts 4 and two adjacent cross-members 5 therefore define a substantially rectangular mounting area 6. In the exemplary embodiment shown in FIG. 1, a PV module 2 is arranged in each of said rectangular mounting areas 6, specifically vertically. By means of the upright arrangement of the PV modules 2, which have active surfaces 9 on both sides, it is possible to efficiently capture sunlight from western and eastern directions and to convert same into electrical current by means of the PV system.

As the detailed view of the PV system 1 in FIG. 2 shows, a plurality of PV modules 2, namely precisely two, are arranged above one another in the vertical direction. In addition, it can readily be seen in FIG. 2 that, for example, the uppermost cross-members 5 are arranged offset with respect to one another in the vertical direction. Since the PV modules 2 are secured to the cross-members 5 by means of holding elements 15, horizontally adjacent PV modules 2 are likewise arranged offset with respect to one another in the vertical direction. This configuration is preferred according to the invention since simple compensation of different terrain profiles can therefore be achieved.

As can readily be seen looking at FIG. 2, the securing sections 7 formed in each case by C-profiles and the holding sections 8 lie back to back against one another and therefore overlap in an overlapping region. It is preferred according to the invention here if the overlapping region is situated above the ground since this facilitates the mounting of the holding section 8 on the securing section 7 and, in addition, the securing section 7 can be anchored in the ground independently of the holding section 8, for example by being rammed in.

FIG. 3 shows a configuration according to the invention of a connection of a post 4, more precisely of the upper holding section 8 thereof, to two horizontally running cross-members 5. While the cross-members 5 are each formed by a U-profile 22, the holding section 8 of the post 4 is formed by a C-shaped profile 12.

For the securing of the two cross-members 5, an opening 14 which is designed as a plug-through opening and through which the cross-members 5 are passed or plugged is provided on the post 4. The opening 14 itself has been produced by punching on the C-profile 12 of the post 4. By means of a punching operation, the two tabs 13 which are illustrated in FIG. 3 and serve according to the invention as holding surfaces 10 can be produced in a relatively simple manner. For example, the two cross-members 5 can be secured very simply and at a variable height to the two tabs 13 by means of screws with a self-tapping thread and correspondingly passed-through holes.

FIG. 4 shows an embodiment, which is provided as an alternative thereto, of holding surfaces 10 according to the invention. For this purpose, the post 4, more precisely its upper holding section 8, is configured by means of an omega profile 12. At its two free ends, the omega profile 12 has two flanges 11 which, unlike the tabs 13 in FIG. 3, run along the entire length of the omega profile 12 and can be used in an advantageous manner as holding surfaces 10 according to the invention. The left cross-member 5 is thus merely plugged into the omega profile 12, while the right cross-member 5 is guided through a plug-through opening 14 which is formed in a side surface of the post 4. As can readily be seen, the two cross-members 5 can be secured lying one above the other to the holding surfaces 10, which are formed in pairs, of the omega profile 12. By means of the configuration of the holding surfaces 10 in pairs, in each case on both side surfaces of a cross-member 5, a particularly stable connection and therefore a particularly stable supporting structure 3 can be achieved. As FIG. 4 shows, the holding surfaces 10 which are configured in pairs grip the cross-members 5 in each case on both sides.

The advantage of a further configuration according to the invention which makes provision for the cross-members 5 to be designed to be narrower than the posts 4 is revealed both in FIG. 3 and in FIG. 4. This configuration then makes it very much easier for cross-members 5 to be able to be guided through plug-through openings 14 in the posts 4 and at the same time to be gripped on both sides, i.e. in particular from the outside, as in FIG. 4, by holding surfaces 10 formed on the posts.

According to the invention, either two cross-members can be placed in a plug-through opening 14, as is illustrated in FIG. 3, or else just one cross-member, as the exemplary embodiment of FIG. 4 shows. As FIG. 4 shows, a further cross-member 5 adjacent to a cross-member 5, which is placed in a plug-through opening 14, can be mounted on a side of the post 4 which lies opposite the plug-through opening 14, specifically without the use of a plug-through opening 14, namely by means of holding surfaces 10 which are formed on the post and are formed by the flanges 11 in FIG. 4. Such a configuration is very useful, for example, in order to compensate for different heights on uneven terrain.

For example, the exemplary embodiment shown in FIG. 3 can optionally be interpreted in such a manner that the post 4, at least its holding section 8, is formed by a profile 12 with a C-shaped or U-shaped basic shape, wherein, in the case of the U shape, the free ends of the profile 12 would be considered to be flanges 11. However, flanges 11 which are intended to serve as holding surfaces 10 are preferably designed according to the invention as in FIG. 4, i.e. the flanges 11 preferably run in the direction of the cross-members 5. This is because this configuration permits a flat bearing of the cross-members 5. The omega profile 12, shown in FIG. 4, of the post 4 can in turn also be considered to be a profile 12 with a C-shaped basic shape, wherein the illustrated holding surfaces 10 at the ends of said profile 12 are designed as flanges 11.

As already indicated in FIG. 2, the PV modules 2 are preferably secured according to the invention to the cross-members 5, wherein, for this purpose, the holding elements 15 shown in FIG. 2 can be provided.

FIG. 5 shows an alternative configuration according to the invention to this, in which groove sections 16 for receiving and for holding the PV modules 2 are provided on the cross-members 5. As shown in FIG. 5, it is generally preferred according to the invention if groove sections 16 lie opposite and/or lie in a common plane. By means of this configuration, the PV modules 2 can then be oriented centrally with respect to the supporting structure 3. The bevels 24 according to the invention on the lower side of the cross-member 5 can also be readily seen in FIG. 5. These bevels 24 minimize the shading of the lower PV module 2 by means of the cross-member 5.

FIG. 6 shows a detailed cross-sectional view through a holding element 15 according to the invention. The holding element 15 is plugged into a plug-through opening 23 which is formed on a lower side of the cross-member 5 which is formed by a U-shaped profile 22. In this case, a contact surface 18 is formed on the holding element 15, with which contact surface the holding element 15 lies flatly against the inner side of the cross-member 5. The effect achieved by the cross-sectional tapered portion 17 which is formed level with the contact surface 18, is that the holding element 15 can be introduced into the plug-through opening 23 as far as a defined plug-in depth. The effect therefore achieved, inter alia, is that the active surfaces 9 of the two PV modules 2 can be mounted at a defined distance from the cross-member 5, and therefore in particular shading can be efficiently avoided. As can readily be seen in FIG. 6, the PV modules 2 are plugged by their borders in each case into the two opposite groove sections 16 of the holding element 15. The plug-in depth here is selected specifically in such a manner that the active surfaces 9 of the PV modules 2 are not covered or shaded by the holding element 15 and/or the cross-member 5 up to a certain angle of incidence.

The just explained features according to the invention of the holding elements 15 are also merely illustrated once again in the perspective view of FIG. 7. In particular, it is apparent from FIG. 7 that the holding elements 15 preferably grip the PV modules 2 on both sides in order to ensure secure holding. For this purpose, it is already sufficient if the holding elements 15 grip the PV modules on both sides only along a certain border section, as illustrated in FIG. 7.

FIGS. 8 and 9 illustrate a further central aspect of the present invention, namely of arranging the active surfaces 9 of the PV modules 2 at a distance from the posts 4 and/or cross-members 5. As shown in the top view of the post 4 in FIG. 8, the active surfaces 9 of the two PV modules 2 arranged on the left and right of the post 4 are at a distance from the post 4 such that sunlight shines onto the active surface 9 up to a certain angle of incidence without being shaded in the process by the post 4. The angle of incidence 4 corresponds in FIG. 8 specifically to the angle which the two rays of sunshine illustrated each enclose with the perpendicular (running horizontally in FIG. 8) of the active surface 9 concerned.

Looking more precisely at the two opposite sides of the PV modules 2, it turns out that the active surfaces 9 on the left and right of the post are not at the same distance from the post 4. On the contrary, they are arranged at an asymmetric distance therefrom. The effect achieved by the somewhat greater distance of the active surface 9 of the PV module 2, which is arranged at the top in FIG. 8, is that, for sunlight from southern directions, shading of the active surface 9 is prevented for angles of greater incidence than is the case for the PV module 2, which is arranged at the bottom of FIG. 8, for sunlight from northern directions. In other words, at the southern border of a PV module 2, the distance between the PV module 2, more precisely its active surface 9, and the post 4 is selected to be somewhat greater than at its northern border, as the two PV modules 2 in FIG. 8 illustrate.

FIG. 9 by contrast shows that, by means of a spacing according to the invention of the active surfaces 9 of the two PV modules 2 illustrated from the transversely running cross-member 5, shading of the active surfaces 9 can be prevented. Since FIG. 9 illustrates a cross section through a horizontally running cross-member 5, the ray of sunshine illustrated is incident on the lower PV module 2 obliquely from above and as a rule laterally. As illustrated in FIG. 9, by means of the spacing of the active surface 9 of the lower PV module 2 from the cross-member 5, a maximum angle of incidence is therefore defined up to which sunlight can strike against the active surface 9 without shading. In FIG. 9, said angle of incidence could correspond to precisely the angle which the incident ray of sunshine illustrated by means of its projection onto the vertically running sectional plane of FIG. 9 encloses with the perpendicular to the active surface 9 (running horizontally in FIG. 9). It is accordingly understood that the actual angle of incidence between the ray of sunshine and axis of incidence can generally be larger than the angle which the projection (illustrated in FIG. 9) of said ray in the sectional plane encloses with the angle of incidence.

In the rare event that, in the case of the PV modules shown in FIG. 9, the axis of incidence of the active surfaces points specifically in the direction of the sun, the angle of incidence illustrated by the ray of sunshine in FIG. 9 would correspond to the position of the sun, i.e. the height of the sun above the horizon, as measured in degrees. As a rule, however, the sunlight will shine in onto the PV modules obliquely from the side, and therefore the position of the sun and the angle of incidence differ from each other. The two rays of sunshine illustrated in FIG. 8 are also incident on the PV modules 2 obliquely from the side, wherein projections of said rays into the horizontally running sectional plane of FIG. 8 are also illustrated here.

Also in the case of the exemplary embodiment illustrated in FIG. 9, an asymmetric spacing of the PV modules from the cross-member 5 could be provided according to the invention. For example, it would be advantageous according to the invention for the upper PV module 2, more precisely active surface 9 thereof, to approach closer to the cross-member 5. Therefore, firstly, the maximum overall height of the supporting structure 3 and therefore the active wind load would be reduced; secondly, shading of the upper active surface 9 by means of the cross-member 5 located therebelow can be prevented since the sunlight is always incident on the PV modules 2 obliquely from above. According to the invention, the upper PV module 2 could therefore approach close to the cross-member 5 until the active surface 9 is just not yet covered by the cross-member 5.

FIG. 10 finally explains further configurations according to the invention of the photovoltaic system 1, in particular the spacing according to the invention of the rows 20 of the PV system 1. As already illustrated in FIGS. 1 and 2, according to the invention, the PV modules 2 can substantially form a plane with the supporting structure 3. For efficient surface use, according to the invention, the PV modules 2, as shown in FIG. 10, are arranged in rows 20 spaced apart from one another. The PV modules 2 of a row 20 therefore also substantially form a plane, wherein said plane can be oriented in particular in the north-south direction, as is the case in FIG. 10. Therefore, in the event of a ray of sunshine being incident, for example, from a western direction (coming from the left in FIG. 10), the situation shown in FIG. 10 can occur that a partial region of a row 20 (here the lower PV modules of the right row 20) is therefore shaded by an adjacent row 20 (here the left row 20).

As indicated by the two rays of sunshine in FIG. 10, the shading increases here, the lower the position of the sun is. Therefore, a configuration as shown in FIG. 10 is preferred, in which the distance, denoted by B, between the two rows 20 is more than three times the maximum height of an active surface 9 of the PV system 1. This maximum height corresponds, in FIG. 10, specifically to the vertical distance A which defines the distance between a highest and a lowest point, in each case within the active surfaces 9 of the left row 20. By means of the horizontal distance B, which is selected to be large according to the invention, between the two rows 20, it is therefore ensured, as the upper ray of sunshine in FIG. 10 shows, that, even in a low position of the sun, only a partial region of the right row 20 is shaded, and therefore at least the upper active surfaces 9 of the right row 20 in FIG. 10 can continue to be used for producing power.

A further advantage of the spacing of the rows 20 of the PV system 1 consists in the open cultivation space 19 which arises between the rows since said open cultivation space can be used, for example, agriculturally. To this end, the invention makes provision in particular to make use of the open cultivation space 19, denoted by a width B in FIG. 10, by an open space 26 being kept free in each case in each row between the posts 4 and between the lowermost cross-member 5 of the supporting structure 3 and the ground surface. As a result of the fact that the PV modules 2 are therefore arranged at least at a height C above the ground (cf. FIG. 10), firstly damage to same by stone chipping during agricultural use of the open cultivation space 19 can be avoided. Secondly, by means of this configuration, in particular the lower active surfaces 9 of the PV system are substantially removed from shading by means of vegetation or planting in the open cultivation space 19. The open space 26 therefore provides the necessary prerequisites for agricultural use of the open cultivation space 19 without significant losses during the production of power.

The advantages of a division according to the invention of the PV system into electrical lines 21 arranged one above another can also be understood with reference to FIG. 10. Owing to the fact that the lower line 21 of the right row 20 in FIG. 10 is separated electrically from the upper line 21 of the right row 20 in FIG. 10, i.e. in particular is in each case assigned to a separate inverter input, the shading of the lower line 21 cannot have an effect on the power produced by the upper line 21. In an analogous manner, the effect of a partial shading of the upper PV module 2 of the right row 20 could be minimized according to the invention in FIG. 10 in that said PV module 2 has two horizontally running electric lines arranged one above another, formed, for example, by two active surfaces 9, which are electrically separated from each other, within the PV module 2.

FIGS. 11 and 12 show electrical connections according to the invention of upper and lower active surfaces 9 of a PV system 1, said surfaces each being illustrated in the upper and lower half of the drawing. The active surfaces 9, 9' shown in FIGS. 11 and 12 each belong here to a separate PV module 2. However, the connection which is explained below of active surfaces 9, 9' can also be applied analogously to PV modules 2 which have a plurality of active surfaces 9, 9' separated electrically from one another, in particular if said surfaces are not arranged next to one another but above one another in the PV system.

In the case of the connection shown in FIG. 11, an upper active surface 9 is in each case connected in parallel to a lower active surface 9' arranged directly therebelow, and therefore the current flow, for example through the upper, left active surface 9 can be different from the current flow through the lower, left, active surface 9'. The lower, active surface 9' which is situated at a height which is different from the upper active surface 9 lying thereabove, can therefore be operated at a different electrical operating point than the upper active surface 9.

A further identical parallel connection formed by the two right active surfaces 9 and 9' is connected in series to said parallel connection. Owing to the double parallel connection, the currents in each individual surface of the active surfaces 9, 9' illustrated can vary.

In the case of the connection shown in FIG. 12, the two upper active surfaces 9 are connected serially to each other. These two active surfaces 9 therefore form an upper electrical line 21 within the meaning of the invention. In the same manner, the two lower active surfaces 9' are connected serially to each other to form a lower electrical line 21. The upper and the lower electrical line 21 are connected in parallel and can therefore be fed, for example, to a common inverter input.

Alternatively, each of the two electrical lines 21 of the connection of FIG. 12 could also be assigned to a separate inverter input. In this case, the two electrical lines 21 would therefore be electrically separated from each other.

While the same current flows through the two upper active surfaces 9 in FIG. 12, the current flow through the upper electrical line 21 can differ from the current flow through the lower electrical line 21. In other words, the lower active surfaces 9' can be operated at an operating point which differs from that at which the two upper active surfaces 9 operate, as is also the case in the connection illustrated in FIG. 11.

FIGS. 13 and 14 finally each show a cross-sectional view through an upper and a lower cross-member 5, in each case illustrated by the shaded areas, of a supporting structure 3 according to the invention. The bifacial PV modules 2 are suspended here on the supporting structure 3 in such a manner that they pivot about an axis of rotation 25, as indicated by the double arrows, as soon as a considerable wind load acts on the PV modules 2. The axis of rotation 25 preferably runs approximately parallel to the cross-members 5 here. According to the invention, it may be advantageous here if the pivoting movement of the PV modules 2 is damped by an additional device.

In the exemplary embodiment shown in FIG. 13, to this end a holding element 15 is provided below the upper rectangular cross-member 5, said holding element surrounding the PV module 2 on both sides and, for its part, being secured to the upper cross-member 5 so as to be rotatable about the axis of rotation 25.

By contrast, in the exemplary embodiment shown in FIG. 14, the cross-members 5 are configured with a round outer contour, and therefore the holding element 15 which holds the PV module 2 can engage annularly around the cross-member 5 and can therefore pivot together with the PV module 2 about the axis of rotation 25, formed by the central axis of the upper cross-member 5.

In summary, for the economical and energy-efficient use of a PV system 1 having upright, in particular bifacial, PV modules 2 and in particular to substantially avoid shading of the PV modules 2, first of all a supporting structure 3 which is very simple to manufacture and to install is provided, said supporting structure being constructed by vertical posts 4, which are connected to one another at intersecting points, and horizontally running cross-members 5 such that rectangular mounting areas 6 can be provided for the individual PV modules 2, wherein the posts 4 and cross-members 5 can preferably each be formed in a material-saving manner by conventional profiles 12, 22, and wherein in particular a division of the posts 4 into two interconnectable sections 7, 8 overall substantially facilitates the assembly; secondly, the invention provides an electrical connection such that active surfaces 9, 9' which are arranged one above another can be operated at different electrical operating points and such that electrical lines 21 are formed which are preferably operated separately from one another and are preferably arranged in a horizontally running manner. The effects of shading of PV modules 2 on the efficiency of the energy conversion of the PV system 1 can therefore be further minimized.

LIST OF REFERENCE SIGNS

1 Photovoltaic system
2 PV module
3 Supporting structure
4 Post
5 Cross-member
6 Mounting area
7 Securing section
8 Holding section
9 (Upper) active surface
9' (Lower) active surface
10 Holding surfaces
11 Flange
12 Profile of 4
13 Tab
14 Opening, in particular plug-through opening, of 4 (for 5)
15 Holding elements
16 Groove section
17 Cross-sectional tapering
18 Contact surface
19 Open cultivation space
20 Row
21 Electrical line
22 Profile of 5
23 Opening, in particular plug-through opening, of 5 (for 15)
24 Bevel
25 Axis of rotation
26 Open space

The invention claimed is:

1. A photovoltaic (PV) system (1), comprising:
a supporting structure (3);
a plurality of bifacial PV modules (2) arranged upright on the supporting structure (3);
the supporting structure (3) includes
a plurality of posts (4) which are configured to be secured on or in the ground,
a plurality of cross-members (5) secured to the posts (4), at least two of the cross-members connecting two adjacent posts (4) to each other, and
two of the posts (4) and two of the cross-members (5) define a substantially rectangular mounting area (6) in which at least one PV module (2) is arranged;
plug-through openings (14) are formed on the posts (4), with the plug-through openings (14) each being configured to receive one said cross-member (5) or an end thereof within the plug-through opening; and
wherein the plug-through openings (14) are formed such that the cross-members (5) are pluggable into the respective plug-through opening (14) at least as deep as a full width of the post (4) forming the respective plug-through opening (14).

2. The photovoltaic system (1) as claimed in claim 1, wherein the posts (4) are oriented substantially vertically and the cross-members (5) are oriented substantially horizontally.

3. The photovoltaic system (1) as claimed in claim 1, wherein each of the posts (4) are divided at least into a securing section (7) which is connected to the ground and a holding section (8) which is connected thereto and extends above the securing section (7).

4. The photovoltaic system (1) as claimed in claim 1, wherein active surfaces (9) of the PV modules (2) are arranged at a distance from at least one of the posts (4) or the cross-members (5), such that at least up to an angle of incidence of 20°, shading of the active surface (9) by posts (4) is prevented, or, at least up to an angle of incidence of 25°, shading of the active surface (9) by cross-members (5) is prevented, or both.

5. The photovoltaic system (1) as claimed in claim 4, wherein two of the PV modules (2) are located horizontally adjacent to one another and arranged asymmetrically on the supporting structure.

6. The photovoltaic system (1) as claimed in claim 1, further comprising holding surfaces (10) formed on the posts (4), and an associated one of the cross-members (5) flatly securable to the holding surface.

7. The photovoltaic system (1) as claimed in claim 6, wherein the holding surfaces (10) are formed in pairs in order to grip one said cross-member (5), which has been pushed between the holding surfaces (10), on both sides, and the cross-members (5) are narrower than the posts (4) at least in an area of the pairs of holding surfaces.

8. The photovoltaic system (1) as claimed in claim 1, wherein at least a portion of each of the posts (4) is formed with an omega profile.

9. The photovoltaic system (1) as claimed in claim 8, wherein one of the cross-members (5) on one side of one said post and another of the cross-members on an opposite side of said post are placed in a same one of the plug-through openings (14) in said post, or only one said cross-member (5) is placed in the plug-through opening (14) while a further cross-member (5) is mounted on a side of the post (4) which lies opposite the plug-through opening (14) that does not have a plug-through opening (14) by holding surfaces (10) formed on the post (4).

10. The photovoltaic system (1) as claimed in claim 1, wherein the posts (4) have a profile (12) that is C-shaped, U-shaped, Z-shaped or S-shaped in cross-section, at least in a holding section (8) of each of the posts.

11. The photovoltaic system (1) as claimed in claim 1, wherein an open space (26) is kept free between the ground and a lowermost cross-member (5), and rows (20) of the PV system (1) are arranged at a distance from one another to provide an open cultivation space having a width of at least 6 meters between the rows (20).

12. The photovoltaic system (1) as claimed in claim 1, wherein the PV modules (2) substantially form a plane with the supporting structure (3).

13. The photovoltaic system (1) as claimed in claim 12, wherein rows (20) of the PV system (1) are arranged at a distance from one another to provide an open space between the rows (20), and a distance between two of the rows (20) is at least three times a maximum height of an active surface (9) of the PV system (1).

14. The photovoltaic system (1) as claimed in claim 1, wherein a plurality of PV modules (2) are arranged one above another in a vertical direction.

15. The photovoltaic system (1) as claimed in claim 1, wherein horizontally adjacent PV modules (2) are arranged offset with respect to one another in a vertical direction.

16. The photovoltaic system (1) as claimed in claim 1, wherein the PV modules (2) are suspended on the supporting structure (3) so as to be pivotable about an axis of rotation (25), which extends approximately parallel to the cross-members (5).

17. The photovoltaic system (1) as claimed in claim 10, wherein holding surfaces (10) are provided as flanges (11) at ends of the profile (12).

18. The photovoltaic system (1) as claimed in claim 1, wherein the PV modules (2) are arranged in a plurality of spaced-apart rows (20), and the PV modules (2) of one row (20) substantially form a plane.

19. A photovoltaic (PV) system (1), comprising:

a supporting structure (3);

a plurality of bifacial PV modules (2) arranged upright on the supporting structure (3);

the supporting structure (3) includes a plurality of posts (4) which are configured to be secured on or in the ground, cross-members (5) secured to the posts (4), said cross-members in each case connecting two adjacent posts (4) to each other, and in each case two of the posts (4) and two of the cross-members (5) define a substantially rectangular mounting area (6) in which at least one PV module (2) is arranged;

separate holding elements (15) are provided for securing the PV modules (2) to the cross-members (5); and the holding elements (15) each have a cross-sectional tapered portion (17), such that each said holding element (15) is plugged into a plug-through opening, which is formed on one of the cross-members (5), such that a contact surface (18) on the holding element (15) lies flatly against the cross-member.

* * * * *